(12) United States Patent
Alkhazraji et al.

(10) Patent No.: US 12,253,644 B2
(45) Date of Patent: Mar. 18, 2025

(54) FLUID FLOW MONITORING IN HYDROCARBON RESERVOIRS USING MAGNETIC NANOPARTICLES

(71) Applicant: Khalifa University of Science and Technology, Abu Dhabi (AE)

(72) Inventors: Saeed Alhassan Alkhazraji, Abu Dhabi (AE); Vassilios Tzitzios, Paraskevi (GR); Georgios Papavassiliou, Paraskevi (GR); Marina Karagianni, Paraskevi (GR); Athanasios Anastasiou, Paraskevi (GR); Savvas Orfanides, Athens (GR); Michael Fardis, Paraskevi (GR); Dimitrios Gournis, Ioannina (GR); Mohammed Subrati, Abu Dhabi (GR)

(73) Assignee: Khalifa University of Science and Technology, Abu Dhabi (AE)

( * ) Notice: Subject to any disclaimer, the term of this patent is extended or adjusted under 35 U.S.C. 154(b) by 279 days.

(21) Appl. No.: 17/783,884

(22) PCT Filed: Dec. 30, 2019

(86) PCT No.: PCT/GR2019/000092
§ 371 (c)(1),
(2) Date: Jun. 9, 2022

(87) PCT Pub. No.: WO2021/136949
PCT Pub. Date: Jul. 8, 2021

(65) Prior Publication Data
US 2023/0009402 A1   Jan. 12, 2023

(51) Int. Cl.
*H01F 1/44*   (2006.01)
*G01V 3/08*   (2006.01)
*G01V 3/30*   (2006.01)

(52) U.S. Cl.
CPC ............... *G01V 3/081* (2013.01); *G01V 3/30* (2013.01)

(58) Field of Classification Search
CPC ....... G01V 3/30; G01V 3/081; G01N 15/0806
See application file for complete search history.

(56) References Cited

U.S. PATENT DOCUMENTS

| | | | | |
|---|---|---|---|---|
| 2012/0276648 | A1* | 11/2012 | van Hal | G01N 33/2823 436/119 |
| 2013/0091941 | A1* | 4/2013 | Huh | C09K 8/588 73/152.08 |
| 2013/0146756 | A1* | 6/2013 | Schmidt | G01V 3/12 250/264 |

FOREIGN PATENT DOCUMENTS

WO   2014144917 A1   9/2014

OTHER PUBLICATIONS

Magnetic Iron Oxide Nanoparticles: Synthesis and Surface Functionalization Strategies, Wu et al., Oct. 2008 (Year: 2008).*

(Continued)

*Primary Examiner* — Alesa Allgood
(74) *Attorney, Agent, or Firm* — Kilpatrick Townsend & Stockton LLP

(57) ABSTRACT

Disclosed herein are methods and systems for monitoring fluid flow in a rock formation that include utilizing a tracer fluid containing a homogeneous dispersion of ultrastable magnetic nanoparticles which can be injected into the rock formation. A series of EM signals can be emitted in formation by a transmitter at a first plurality of discrete depths along a first path, that can be recorded by a receiver at a second plurality of locations at a second plurality of discrete depth. The received EM signals can be processed to generate a set of EM permeability data that is indicative of variations in magnetic permeability between the first path and the (Continued)

second path. A magnetic permeability map can be generated that is indicative of a location of the tracer fluid.

15 Claims, 13 Drawing Sheets

(56) References Cited

OTHER PUBLICATIONS

PCT/GR2019/000092; International Search Report and Written Opinion dated Nov. 16, 2020; 20 pages.
PCT/GR2019/000092, "Invitation to Pay Additional Fees and, Where Applicable, Protest Fee", Sep. 24, 2020, 12 pages.
Bourlinos et al., "Synthesis of Capped Ultrafine Gamma-Fe2O3 Particles from Iron(III) Hydroxide Caprylate: A Novel Starting Material for Readily Attainable Organosols", Chemistry of Materials, vol. 14, No. 2, Feb. 1, 2002, pp. 899-903.
Wei et al., "Magnetic Iron Oxide Nanoparticles: Synthesis and Surface Functionalization Strategies", Nanoscale Research Letters, vol. 3, No. 11, Oct. 2, 2008, pp. 397-415.

\* cited by examiner

FLUID FLOW MONITORING IN HYDROCARBON RESERVOIRS USING MAGNETIC NANOPARTICLES

BACKGROUND

Production of oil and/or gas from a hydrocarbon reservoir typically fails to extract of the oil and/or gas, thereby leaving some of the oil and/or gas, which is retained in geological structures of the reservoir, despite the use of various approaches to remove the retained oil and/or gas. Retained oil that cannot be produced via gas or water displacement is known as residual oil saturation. Residual oil saturation can also be characterized as the fraction of the pore space in a rock formation occupied by oil, and knowing the residual oil saturation is important for optimal management of the oil reservoir. In particular, knowing the residual oil saturation in the mature oil reservoir is the key requisite for the design and implementation of enhanced oil recovery methods.

Important elements to determining residual oil saturation include knowing the physical properties of the reservoir rock, e.g., porosity, pore interconnectivity, fluid saturation, temperature, and anisotropy. In this context, seismic and electric methods are generally used in reservoir rocks characterization, with electrical conductivity being the property that has more direct relationship to water and oil saturation characterization, because porosity, pore fluid conductivity, saturation, and temperature all influence the conductivity. However, continued improvement in materials and techniques for reservoir monitoring are needed.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In at least one embodiment, a method of monitoring fluid flow in a rock formation (e.g., a hydrocarbon reservoir) can include introducing a tracer fluid containing a homogeneous dispersion of ultrastable magnetic nanoparticles into the rock formation. Using a transmitter, a first series of electromagnetic (EM) signals can be emitted and transmitted through the hydrocarbon reservoir by a from a first transmission depth located along a first bore. The series of EM signals can be received by a receiver at a first plurality of receiving depths located along a second bore spatially separated from the first bore. For each respective transmitting depth, the receiver can scan the entirety of the second bore (e.g., by moving the receiver, by using multiple receivers, or other suitable means).

A second series of EM signals can be transmitted through the hydrocarbon reservoir by the transmitter from a second transmission depth along the first bore, and received by the receiver at a second plurality of receiving depths located along the second bore. The first and second pluralities of receiving depths can be different, or can be identical. A first set of EM permeability data for a region between the first bore and the second bore can then be generated based on the received first series of EM signals and based on the received second series of EM signals, indicative of variations in magnetic permeability between the first bore and the second bore. Addition sets of EM signals can be transmitted and received from additional, and potentially many discrete depths, resulting in a web of signal coverage between the first and second bores.

Based on the first set of EM permeability data, a magnetic permeability map of the region between the first bore and the second bore can be generated that is indicative of the relative magnetic permeability throughout the scanned 2D space. This magnetic permeability map can be used to determine the location of the tracer fluid and, as the tracer fluid moves over time, additional scans of the hydrocarbon reservoir can be obtained by the methods described herein to detect changes in the magnetic permeability map over time indicative of fluid flow within the reservoir.

In at least one embodiment, a system for monitoring fluid flow in a rock formation can include a first transmitter configured for deployment along a first bore in or adjacent the hydrocarbon reservoir, and a first receiver configured for deployment along a second bore spatially separated from the first bore. The system can be configured to cause the first transmitter to emit a series of EM signals from a first plurality of transmitting locations at varying depth along the first bore, and cause the first receiver to receive the series of EM signals from a second plurality of receiving locations at varying depth along the second bore. The received EM signals can be processed based on their corresponding, transmitted EM signals to determine changes in EM signal amplitude or phase indicative of the magnetic permeability between any two positions.

This data can be used to generate a first set of EM permeability data for a region between the first bore and the second bore, based on the series of received EM signals and the series of emitted EM signals, indicative of variations in magnetic permeability between the first bore and the second bore. The system can subsequently generate, based on the first set of EM permeability data, a first magnetic permeability map of the region between the first bore and the second bore that is indicative of a location of the tracer fluid.

In at least one embodiment, a method of forming an ultrastable magnetic tracer fluid for hydrocarbon reservoir mapping can include generating an aqueous solution of iron (III) and iron (II) precursors, causing co-precipitation of the iron (III) and iron (II) precursors in the aqueous solution under alkaline conditions using ammonium hydroxide, and capping the growth of iron oxide nanocrystals from the precursors using citric acid to form nanoparticles of hydrophilic citric acid-capped iron oxide $\gamma$-$Fe_2O_3$. The formed nanoparticles are ultradense and ultrastable, and may have an average nanoparticle size of about 10 nm, permitting them to withstand the harsh temperature and pressure conditions down-well, while being capable of penetrating rock formations having a small pore size and containing formation water. The magnetic nanoparticles (MNPs) are also highly stable, including in saline solutions, and can be transported to a work site for injection in the form of a concentrated solution or dehydrated powder, and subsequently mixed with seawater or formation water or a combination of both.

BRIEF DESCRIPTION OF THE DRAWINGS

Various embodiments in accordance with the present disclosure will be described with reference to the drawings, in which:

FIG. 4A illustrates a glass vial containing a homogeneous dispersion of fabricated CA-MNPs in seawater while

DETAILED DESCRIPTION OF THE INVENTION

Figure 1:
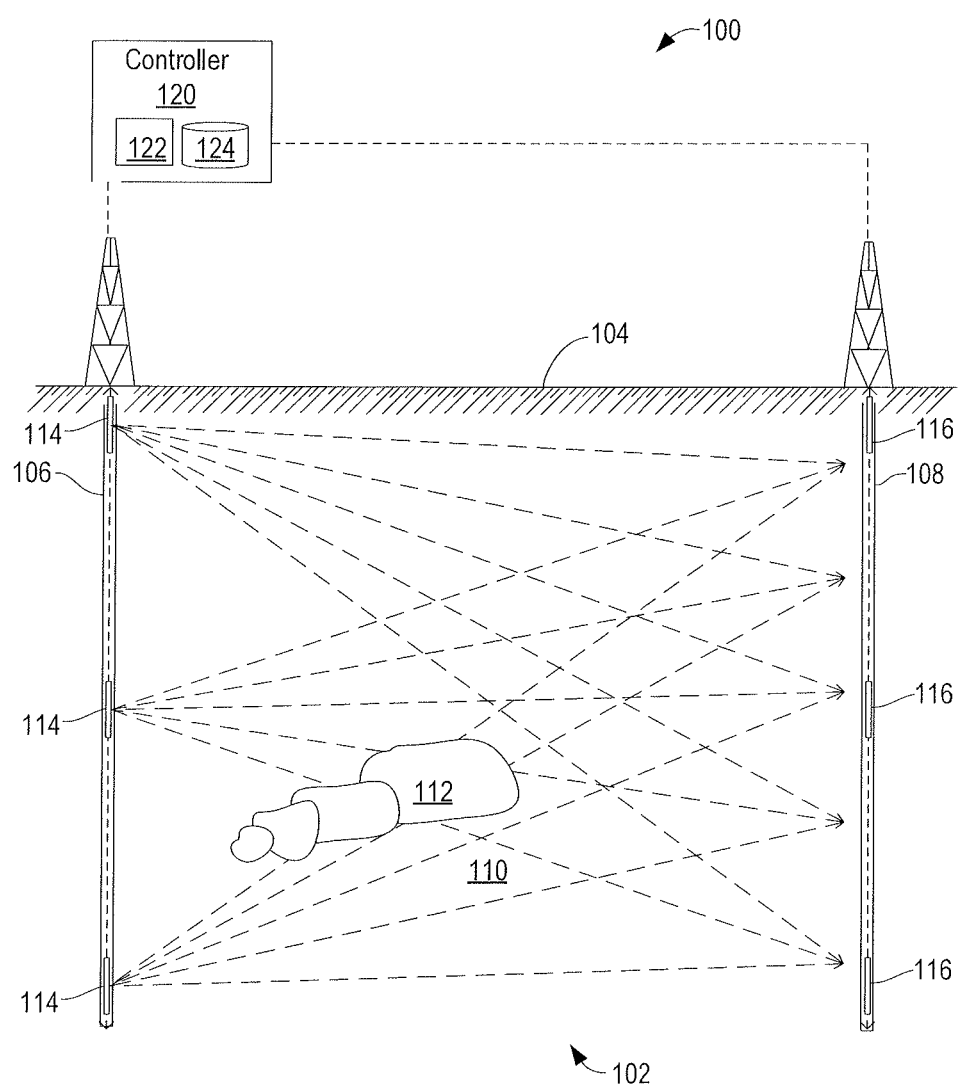
FIG. 1 is a simplified side-view schematic of a system for mapping a hydrocarbon reservoir using fabricated citric acid-capped magnetic nanoparticles (CA-MNPs) and a magnetic permeability method.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

The present disclosure relates to methods and compositions used in tracking the movement of fluids in subsurface formations with the help of injection of magnetic nanoparticles dispersed into seawater, formation water, or other suitable source.

Existing methods currently used for oil saturation determination have difficulty obtaining reliable information for a large volume of the reservoir. For example, the probing range of Nuclear Magnetic Resonance (NMR) logging is very short, i.e., centimeters. With the analysis of the effluent profile of partitioning tracers produced at the production wells, only the average oil saturation in the oil reservoir can usually be determined. Furthermore, long-range probing technologies (e.g. seismic methods) lack the required resolution, and in harsh environments with high temperatures and pressures, many of the logging tools become unreliable.

The natural field methods for subsurface oil exploration and reservoir management utilize gravitational, magnetic, electrical, and electromagnetic fields. Monitoring the local perturbations in these naturally occurring fields can illuminates some of the chemical and physical properties of reservoir fluids and rocks beyond the wellbore, but are limited in resolution, range, and accuracy. In the present disclosure we describe novel alternative based on imaging the magnetic permeability of the reservoir after injecting magnetic nanoparticles (MNPs) into the reservoir, iterative methods which enable tracking fluid motion in the reservoir irrespective of the conductive-fluid content in the reservoir, as well as novel MNPs suitable for use in the harsh conditions down well.

An element of reservoir management is the competency to monitor fluid motion in producing fields. One strategy for optimizing production involves continuous or repeated monitoring of reservoir properties. This practice helps operators identify and respond to changes in reservoir conditions requiring intervention. Reservoir monitoring options vary from repeated measurements of pressure transients across multiple wells and time-lapse seismic data acquired throughout the producing life of a field. However, although inter-well pressure transients enable an operator to monitor fluid movements, they typically only provide information in the near-wellbore vicinity. On the other hand, seismic surveys illuminate reservoir volumes but tend to exhibit poor vertical resolution, and they are more sensitive to the rock matrix than to fluid type and distribution within a reservoir. To better manage hydrocarbons lying between wells, operators need a fluid-saturation survey that investigates farther into a reservoir than electrical logs but at better resolution than is attained with seismic surveys. However, to date, methods attempting to monitor the motion of conductive fluids (e.g. seawater) with cross-well EM tomography are disturbed in conductive formations.

In the present disclosure, a novel very low frequency (50-1000 Hz) cross-well EM logging method is presented, which is not based on the conductivity contrast, but instead on the magnetic permeability contrast, created by flooding an ultra-stable water dispersion of citric-acid capped γ-Fe2O3 MNPs into the reservoir. Unlike previously described methods, both the vertical and radial position of magnetic nanoparticles can be acquired, and can be acquired with sufficient rapidity to enable detection of fluid movement. Another advantage of the presently disclosed methods is the development and use of MNPs that are stable in both seawater and formation water, thus making possible to propel the MNPs throughout the reservoir.

The novel magnetic nanoparticle (MNP) based cross-well electromagnetic (EM) logging methods described herein are immune to the presence of disturbing conductive fluids, by exploiting ultra-stable hydrophilic MNPs as contrast agents, in order to obtain high resolution EM images of the fluid motion in extended reservoir areas. The methods disclosed enable monitoring static and moving magnetic fluids at cross-well distances up to 1 km, or more. The disclosed MNPs also exhibit high stability of the magnetic fluid in seawater and formation water, and resilience against adverse conditions of high pressure and temperature.

For a highly permeable interval, hydrophilic and ultrastable MNPs can be dispersed in an aqueous medium (e.g., seawater, formation water) and injected into a bore in a hydrocarbon reservoir. Upon injection, the MNPs should easily flow into the formation, whereas for a low permeability interval the nanoparticles will have a tendency to build up on the borehole wall. These two different situations can be identified and monitored using time dependent downhole magnetic susceptibility measurements. A system for hydrocarbon reservoir mapping is described schematically in FIG. 1.

FIG. 1 is a simplified side schematic illustration 100 of a hydrocarbon reservoir 102 at arbitrary depth below ground level 104. Two or more, and potentially many, bores 106, 108 can be bored through the substrate 110 for extracting hydrocarbons, for providing a conduit for investigating the contents of the reservoir, for injecting fluid (e.g. seawater, formation water, which may or may not contain MNPs), or other purposes. For purposes of discussion, the first bore 106 can be used for injecting fluid and as a conduit for emitting EM radiation, and the second conduit 108 can be used for extracting hydrocarbons and for scanning/receiving EM radiation emitted from within the first bore.

According to various embodiments of the present disclosure, the synthesized MNPs can be mixed with seawater at the first borehole 106 to form a magnetic fluid, which will be subsequently injected into the reservoir (i.e., injected by gravity or under pressure at either the first bore 106, second bore 108, or at another bore (not shown) in the region of interest) where it will pass through the rock formation forming a magnetic slug or ferrofluid pocket 112. The position of the magnetic fluid can then be tracked with a novel cross-well EM-logging method described herein. The synthesized magnetic fluids are capable of motion through the rock subsurface structure without deterioration or substantial retention, even under harsh conditions. As they pass through the reservoir, the magnetic fluids can be detected on the basis of magnetic permeability. A transmitting assembly 114 can be lowered down the first bore 106, for example, and transmit EM energy in low-frequency band (e.g., 50-1000 Hz) at which magnetic permeability contrast can be detected. Concurrently, a receiving assembly 116 can be lowered down the second bore hole 108, and receive the transmitted EM signals from the transmitting assembly.

The transmitting and receiving assemblies 114, 116 can be moved separately in order to scan the reservoir according to a grid, thus permitting the system 100 to capture information that is sensitive not only to the depth of the ferrofluid pocket 112, but also to its radial position. According to some embodiments, rather than repeatedly moving the transmitting and receiving assemblies 114, 116, the bores 106, 108 can contain stationary antennae or segmented antennae that can emit and receive signals at multiple locations. The received EM signals detected by the receiving assembly 116 can be processed by a controller 120 (e.g., a computing system including one or more processors 122 and memory devices 124 in order to determine the change in amplitude, phase, or frequency associated with each transmitted/received EM signal. The process of scanning the hydrocarbon reservoir 102 can be repeated over time to capture EM permeability data over the region of interest over time as the ferrofluid pocket 112 migrates through the formation 110. The motion or dispersion of the ferrofluid pocket can be indicative of the movement of formation water within the hydrocarbon reservoir, or of the movement of stored hydrocarbons, thus providing a useful indicator of subsurface reservoir permeability.

Figure 2A:
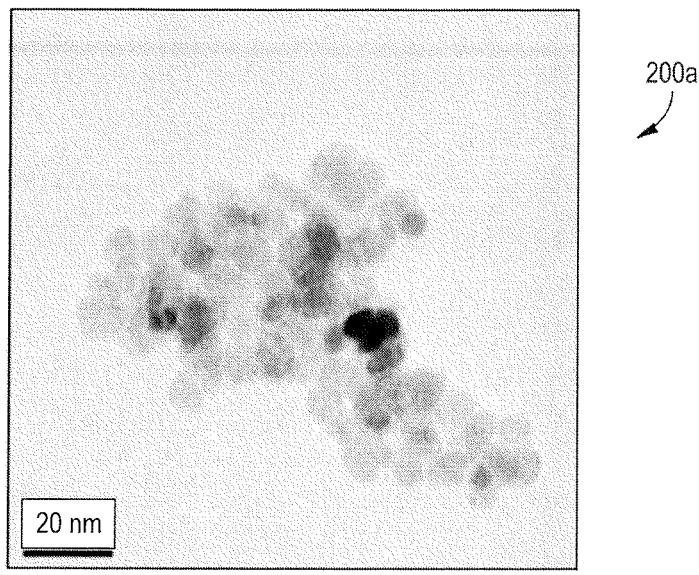
FIG. 2A and FIG. 2B are Transmission Electron Microscopy (TEM) images showing fabricated CA-MNPs.
Figure 2B:
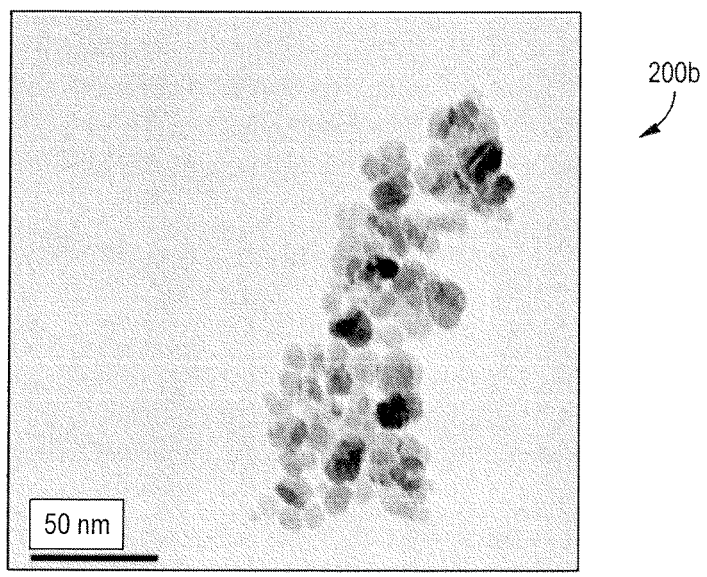

The detection methods disclosed herein provide novel and nonobvious improvements over conventional cross-well EM logging methods by employing cross-well measurement of magnetic permeability rather than conductivity, using the ultra-high-density and ultra-stable MNPs described above. A 2D or 3D topographic map can then be created by inverting the EM data, which allows greatly improved topographic contrast produced by utilizing the ultra-dense and ultra-stable hydrophilic MNPs for EM and the concomitant large changes in the magnetic permeability of the formation due to the injected MNPs. According to some embodiments, the EM mapping method can be utilized with a ferrofluid composed of ultradense and ultrastable CA-capped MNPs (e.g., maghemite ($\gamma$-$Fe_2O_3$) nanoparticles). A detailed characterization of suitable CA-MNPs is shown in FIGS. 2A and 2B, which are electron micrographs showing CA-MNP's 200a and 200b with average sizes of approximately 10 nm.

Figure 3:
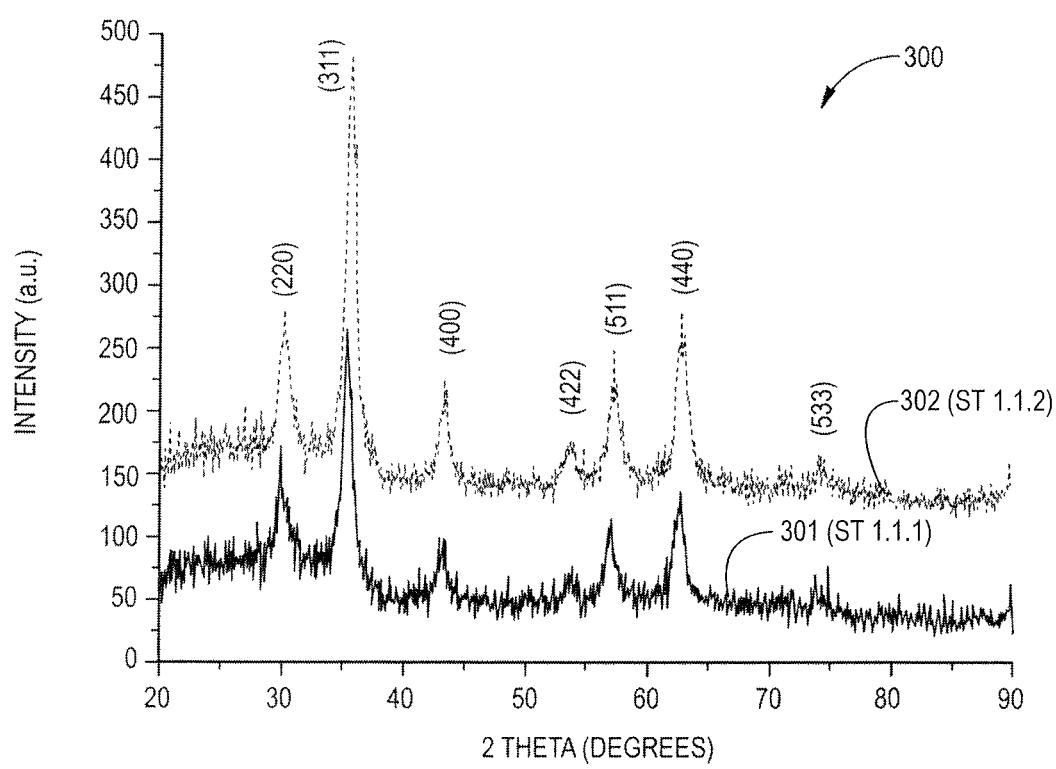
FIG. 3 illustrates X-ray Diffraction Patterns of the fabricated CA-MNPs.

A detailed characterization of suitable CA-MNPs by means of X-Ray Diffraction is shown in FIG. 3, which depicts the XRD patterns (300) of CA-MNPs samples 301 (ST 1.1.1) and 302 (ST1.1.2), with characteristic peaks confirming that the fabricated CA-capped MNPs are maghemite ($\gamma$-$Fe_2O_3$) nanoparticles.

Figure 4A:
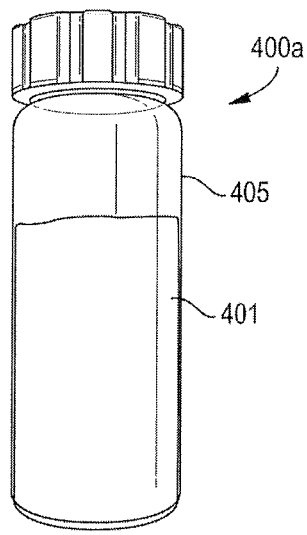
Figure 4B:
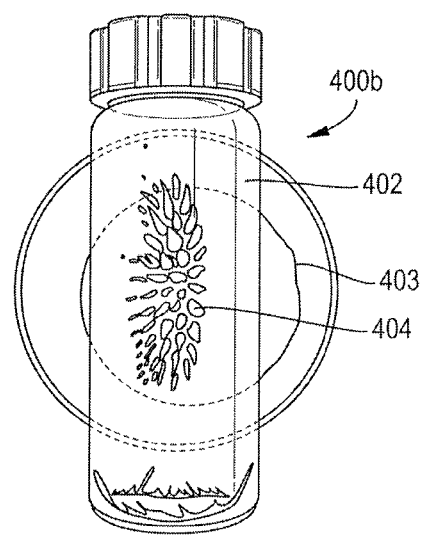
FIG. 4B illustrates the behavior of a small quantity of the same dispersion when subjected to a magnetic field.

FIGS. 4A and 4B are schematic diagrams illustrating the effect of a strong magnet on a homogeneous dispersion of fabricated CA-MNPs. FIG. 4A is a schematic illustration 400a of a glass vial 405 containing a homogeneous dispersion of fabricated CA-MNPs 401 in the absence of a magnetic field. FIG. 4B is a schematic illustration 400b of the same ferrofluid 401 under the influence of a strong magnet 403. The ferrofluid is collected in the region above the magnet 403 forming the characteristic pattern of needle-like peaks 404 and leaving the rest of the glass vial space empty 402.

Figure 5:
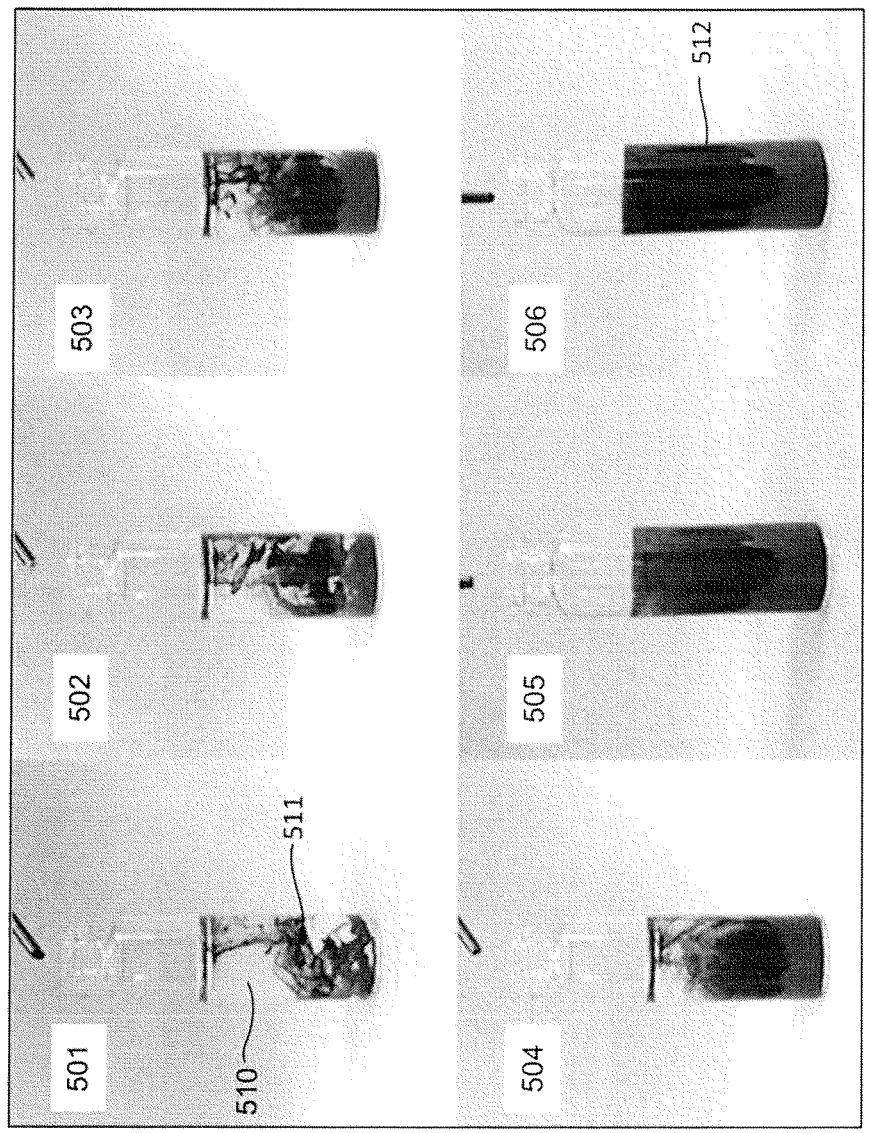
FIG. 5 is a series of images that show the droplet-by-droplet dispersion of CA-MNPs in seawater to form a homogeneous dispersion.

FIG. 5 is a series of images 501-506 that show the droplet-by-droplet dispersion of a homogeneous dispersion of CA-MNPs 511 when in contact with seawater 510 to form a new homogenous dispersion 512. Similar behaviors (i.e., rapid dispersion, and a strong reaction to magnetic field) are observed when the CA-MNPs are dispersed into formation water. Another important result is that a high-salinity dense aqueous ferrofluid can be readily produced by dispersing dry CA-MNPs in seawater at a concentration of at least 500 g/L and a corresponding density of 1.28 g/mL.

EM Logging Methods

The ultra-dense hydrophilic MNPs were used to validate the successful development of a magnetic cross-well EM methodology, and construction of a prototype device at laboratory scale for proof-of-concept demonstration. Theoretical (simulations with COMSOL) and experimental results show that the method is applicable for cross-well distances up to 1 km. In addition, successful inversion of the acquired data using a modified 2D Tikhonov Regularization Algorithm was achieved, which has been suitably configured to accurately reconstruct the spatial position of magnetic fluid in a rock formation.

The novel Magnetic Cross-Well EM logging method for monitoring subsurface movement of fluids provide several advantages over existing monitoring techniques, including but not limited to the following:

1. Very high sensitivity in the frequency range 50-1000 Hz, which makes the method applicable at very large cross-well distances (i.e., 500-1000 m according to COMSOL simulations).
2. Superior to conventional conductivity cross-well EM logging method for monitoring fluid motion in the reservoir, because the method is immune to existing reservoir conductivity disturbances (e.g. existing formation water). The magnetic disturbance (i.e. the MNPs) is introduced with flooding, not present previously in the reservoir.

An advanced Inversion Algorithm (Tikhonov regularization approach) has been developed by solving the Maxwell Equations in the Born approximation, and by using a setup of 2 antennas, Transmitting (Tx) and Receiving (Rx), in cross-well geometry, with a slug of MNPs between the antennas. A slug of MNPs was allocated in a reservoir (simulated data), irradiated by EM waves, and the recorded EM data at the receiver was acquired for different transmitter/receiver positions and then inverted to acquire the spatial position of the magnetic nanoparticles. On the basis of the above Integral Equation Solution, a 2D Tikhonov Regularization Algorithm has been implemented both experimentally and in simulated data, resulting in precise monitoring of the MNP position.

Figure 6:
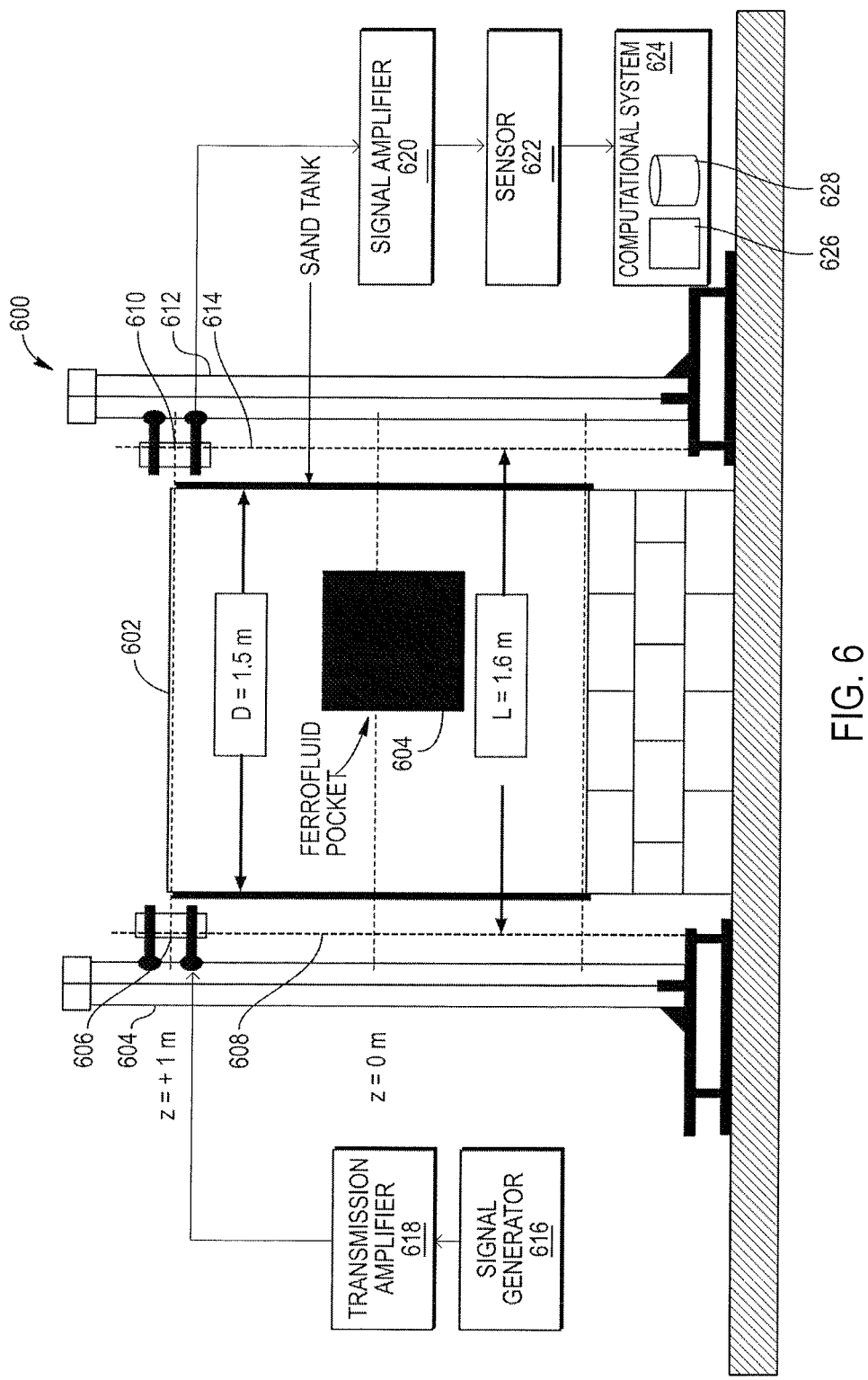
FIG. 6 is a simplified schematic diagram illustrating a prototype EM mapping device used to test the capacity of synthesized MNPs as a reservoir contrast agent.

FIG. 6 is a schematic diagram illustrating a laboratory prototype 600 used in order to test the capacity of the synthesized MNPs as a reservoir mapping contrast agent, in which the location of a MNP slug or ferrofluid pocket 604 was detected with the magnetic cross-well EM logging tool. The prototype device includes an EM transmitting unit 606 and an EM receiving unit 610, aligned on rails 604, 612 to either side of a sand-containing tank 602. The EM transmitting unit 606 is connected with a frequency synthesizer/signal generator 616 providing EM sinusoidal waves in the frequency range 1 Hz-20 MHz and a transmission amplifier 618 (capable of producing 1-1000 Watts in the frequency range 100 Hz-20 MHz), and the transmitting unit 606 includes a transmitting antenna formed of a cylindrical coil with a ferrite core. The receiving unit 610 includes a receiving antenna (cylindrical coil with ferrite core) connected to a signal amplifier 620 that can include a pre-amplifying unit and subsequently a lock-in amplifier, which uses the sinusoidal signal produced by the frequency synthesizer as reference. In this way the amplitude and phase of the EM signal at the receiver can be captured by a sensor 622 and compared, by a computational system 624 (including processor 626 and nonvolatile memory 628), with the reference signal to determine a relative amplitude and phase shift of the signal with respect to the reference signal.

In order to map the sand-containing tank 602, the transmitting unit 606 and the receiving unit 610 were moved along respective first and second paths 608, 614 by moving the units along each of the rails 604, 612. The receiver signal was monitored for 50 equally distanced positions of the transmitting and receiving coils, providing a two-dimensional grid of EM signals acquired at the receiver (shown in mid panels 702a, 702b, 702c of FIGS. 7A, 7B and 7C). A system of step-motors guided by the appropriate software was used to change the coil positions and to acquire the EM 2D data. The paths 608, 614 are analogous to bore-holes along which transmitters and/or receivers may be used to conduct EM mapping in the field.

Figure 7A:
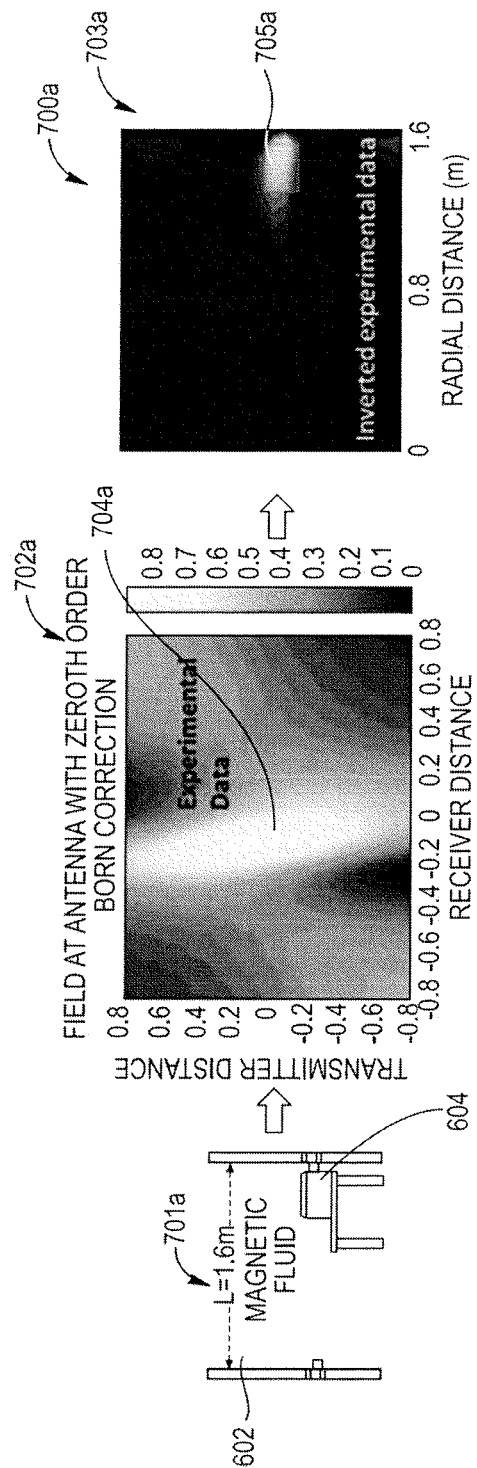
FIGS. 7A, 7B, and 7C are simplified diagrams illustrating a process for locating a ferrofluid pocket in conjunction with the mapping device shown in FIG. 6.
Figure 7B:
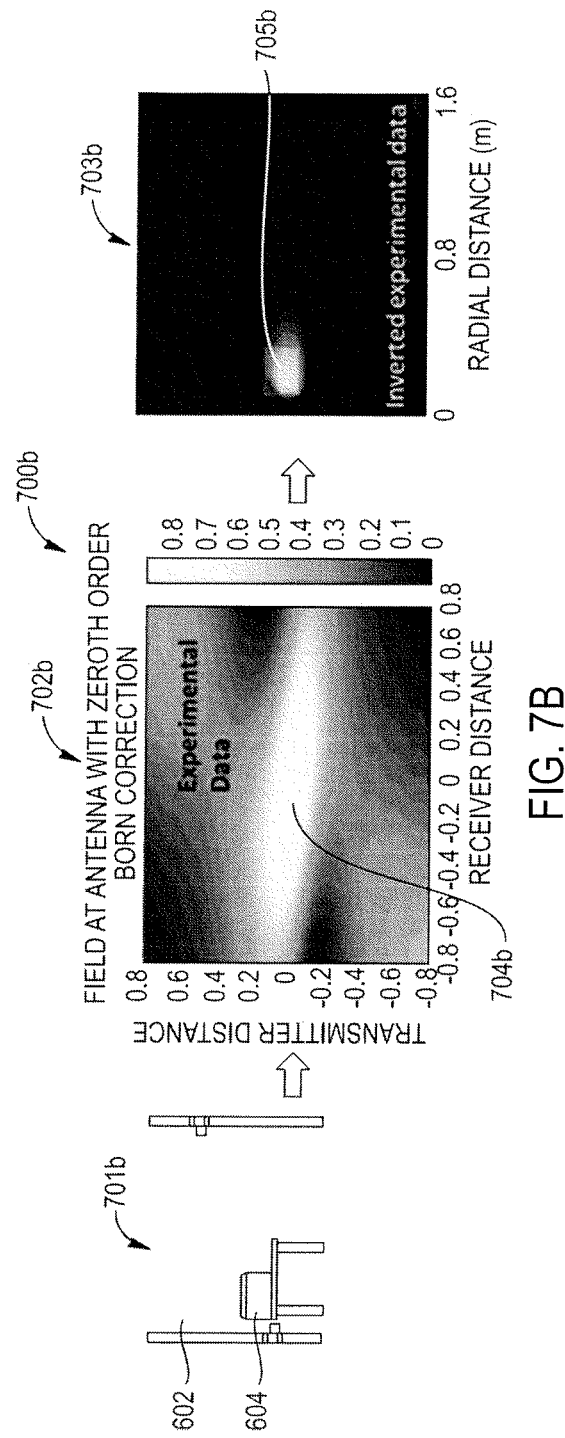
Figure 7C:
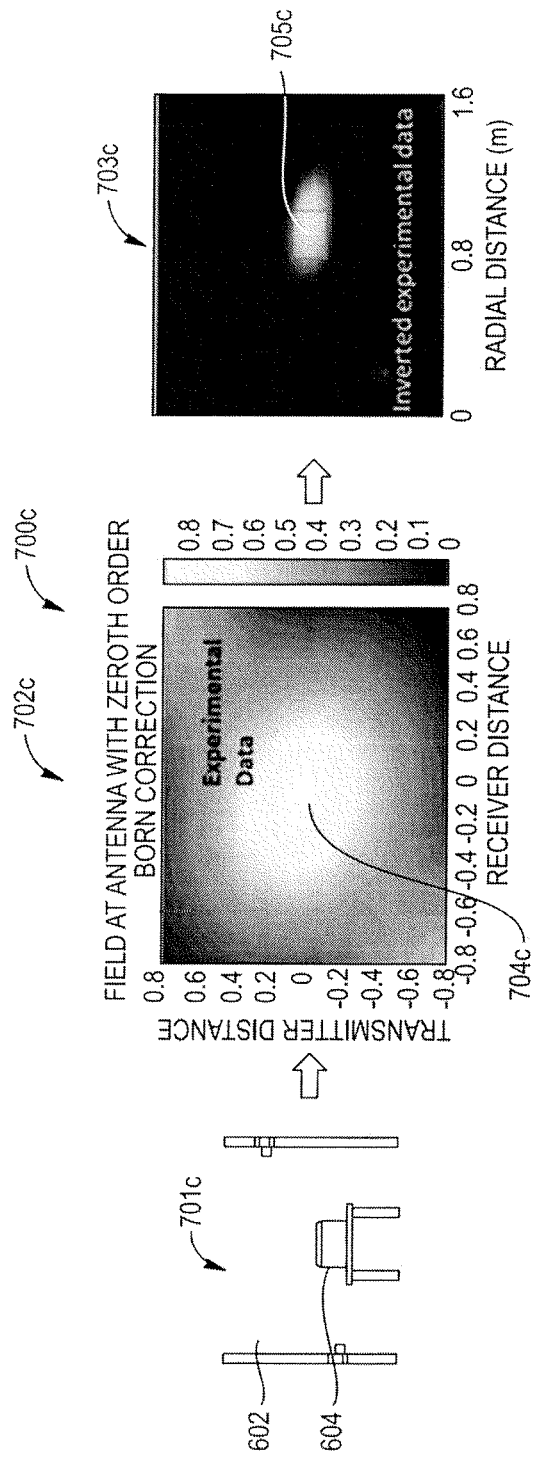

FIGS. 7A, 7B and 7C illustrate a process by which the novel EM logging method based on magnetic permeability was used to ascertain the location of the ferrofluid pocket 604 in the apparatus 600 of FIG. 6. FIG. 7A illustrates a first process 700a by which a ferrofluid pocket 604 was detected near the receiver; FIG. 7B illustrates a second process 700b by which a ferrofluid pocket was detected near the transmitter, and FIG. 7C illustrates a third process 700c by which the ferrofluid pocket was detected within the center of the sand tank 602.

In order to acquire the ferrofluid pocket position, a novel inversion algorithm was used in order to acquire magnetic permeability maps instead of electric conductivity maps as in a conventional cross-well EM logging method. Specifically, Maxwell equations were solved on the basis of dyadic Green's functions. Based on the above solutions, a two dimensional (2D) Tikhonov Regularization Algorithm was implemented, where 2D data are lexicographically transformed in a single column and subsequently inverted by applying a one dimensional (1D) Tikhonov inversion. Discrete Hankel Transform algorithms were then used to acquire the Kernel function of the inversion. Unwrapping the inverted 1D data in two dimensions with a reverse lexicographic algorithm, 2D images with the location of the magnetic slug were acquired. References showcasing the framework where the novel inversion algorithm is based include: (1) Hee Joon Kim, Ki Ha Lee, and Michael Wilt, "A fast inversion method for interpreting borehole electromagnetic data", Earth Planets Space 55, 249-254, 2003; and (2) Mitchell, J.; Chandrasekera, T.; Gladden, L. Numerical estimation of relaxation and diffusion distributions in two dimensions. Progress in Nuclear Magnetic Resonance, Spectroscopy 62, 34-50, 2012. These references are hereby incorporated by reference for all purposes. By implementing the inversion algorithm, the position of the MNPs is acquired as presented in the right panels of FIGS. 7A-7C.

In FIG. 7A, the first experimental setup 701a includes the ferrofluid pocket 604 positioned to the right side of the tank 602, proximate to the receiver, resulting in 2D EM data 702a as shown, with a peak region 704a indicative of the field strength at various transmitter/receiver configurations. The EM data 702a is inverted by the methods described above to result in a 2D magnetic permeability map 703a, in which a region of peak magnetic permeability 705a is readily identifiable, and closely aligned with the actual location of the ferrofluid pocket 604. FIGS. 7B and 7C illustrate the detection of the ferrofluid pocket at various other locations. For example, in FIG. 7B, a second experimental setup 701b includes the ferrofluid pocket 604 positioned to the left side of the tank 602, proximate to the transmitter, resulting in 2D EM data 702b as shown, with a peak region 704b indicative of the field strength at various transmitter/receiver configurations. The EM data 702b is inverted to generate 2D magnetic permeability map 703b, in which the region of peak magnetic permeability 705b is also readily identifiable and closely aligned with the changed location of the ferrofluid pocket 604. These methods work equally well when the ferrofluid pocket 604 is located in the region between the transmitter and receiver, e.g., as shown in a third experimental setup 701c in FIG. 7C. The 2D EM data 702c can be inverted to generate a third magnetic permeability map 703c, in which the region of peak magnetic permeability 705c is also well-aligned with the actual location of the ferrofluid pocket 604.

Figures 8A, 8B, 8C:
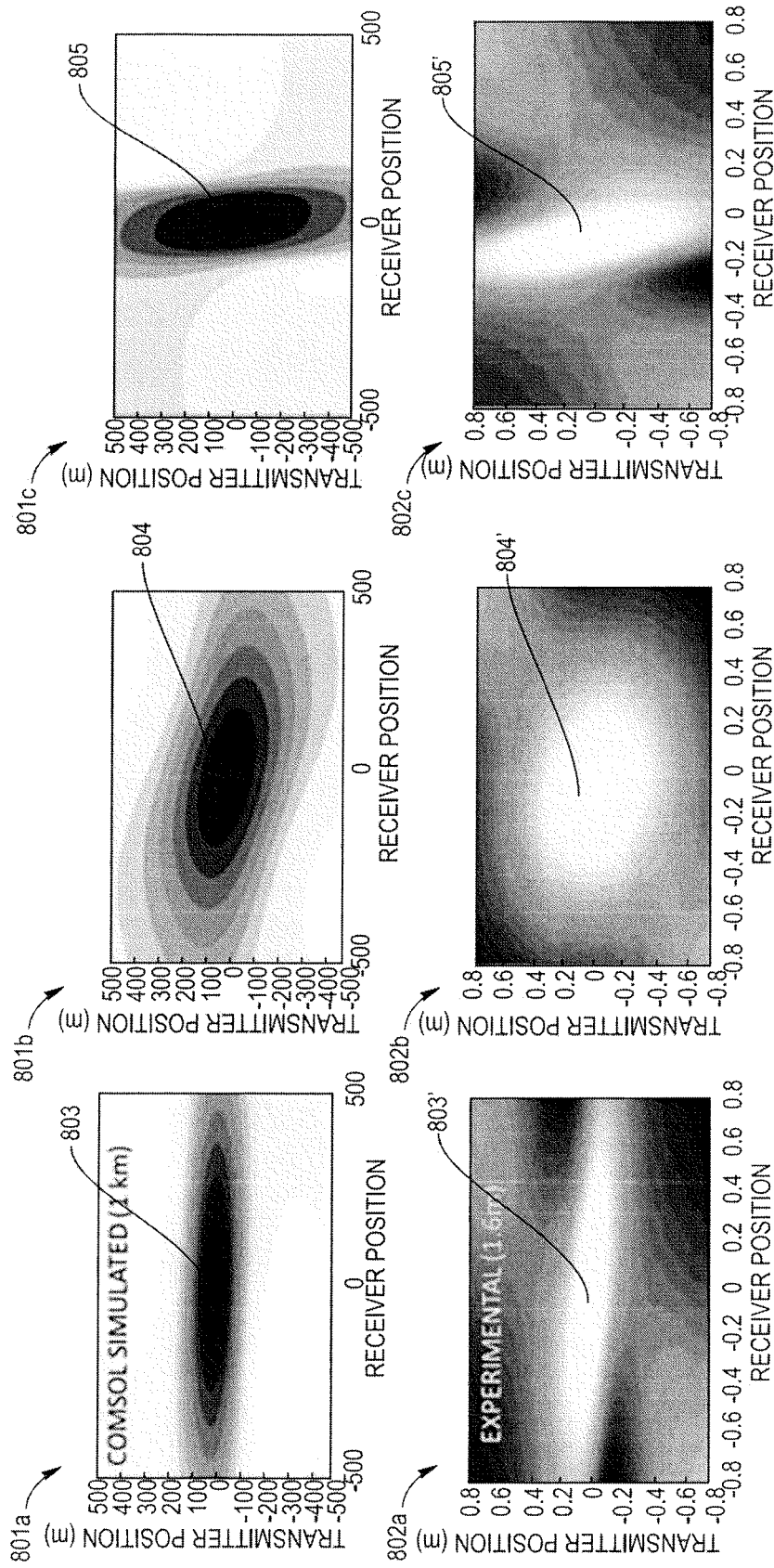
FIGS. 8A, 8B and 8C are pairs of graphical representations illustrating and comparing simulated and experimental 2D EM data.

Importantly, when comparing the acquired 2D EM data with COMSOL simulations it is clearly observed that the position of the fabricated MNPs is excellently monitored at inter-well distances up to 1 km. See, e.g., FIGS. 8A, 8B, and 8C, in which COMSOL simulated and experimental 2D EM data were compared based on common ferrofluid pocket locations. FIG. 8A, which corresponds to a ferrofluid pocket positioned near the transmitter bore, shows a high match between predicted 2D EM field heat chart 801a and the experimental chart 802a generated based on a first ferrofluid pocket location, with similarities evident based on the shape and contrast of the first computer-simulated peak region 803 and the first experimentally acquired peak region 803'.

A similarly good match was obtained as shown in FIG. 8B, which corresponds to a ferrofluid pocket located midway between the transmitter and receiver bores, and shows a high match between a second predicted 2D EM field heat chart 801b and the matching second experimental chart 802b, with similar shape and contrast of the second computer-simulated peak region 804 and the second experimentally acquired peak region 804'. FIG. 8C, which corresponds to a ferrofluid pocket located near the receiver bore, shows a high match between a third predicted 2D EM field heat chart 801c and the matching third experimental chart 802c, with similar shape and contrast of the third computer-simulated peak region 805 and the third experimentally acquired peak region 805'.

Figure 9:
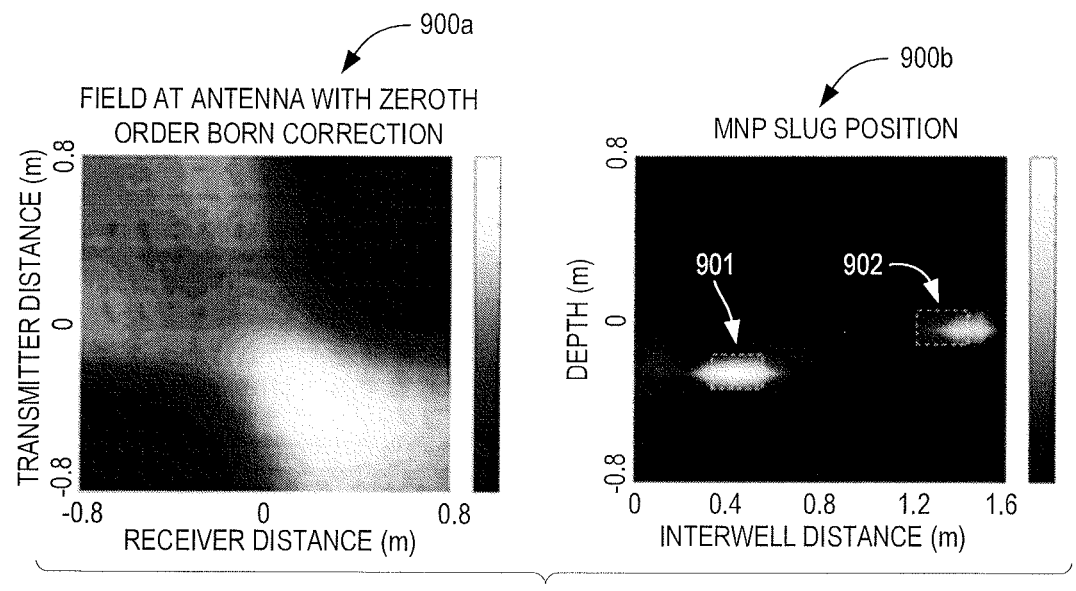
FIG. 9 shows a pair of graphical representations illustrating experimental 2D EM data indicative of two MNP ferrofluid pocket locations.

The same methods have been applied to identify multiple MNP ferrofluid pockets, as shown in FIG. 9. In FIG. 9, a 2D EM field heat chart 900a is generated from the experimental apparatus based on the locations of two distinct MNP ferrofluid pockets. The represented data, when inverted according to the methods described above, allows for reconstruction of the spatial positions of both distinct MNP ferrofluid pockets as shown in magnetic permeability map 900b.

Figure 10:
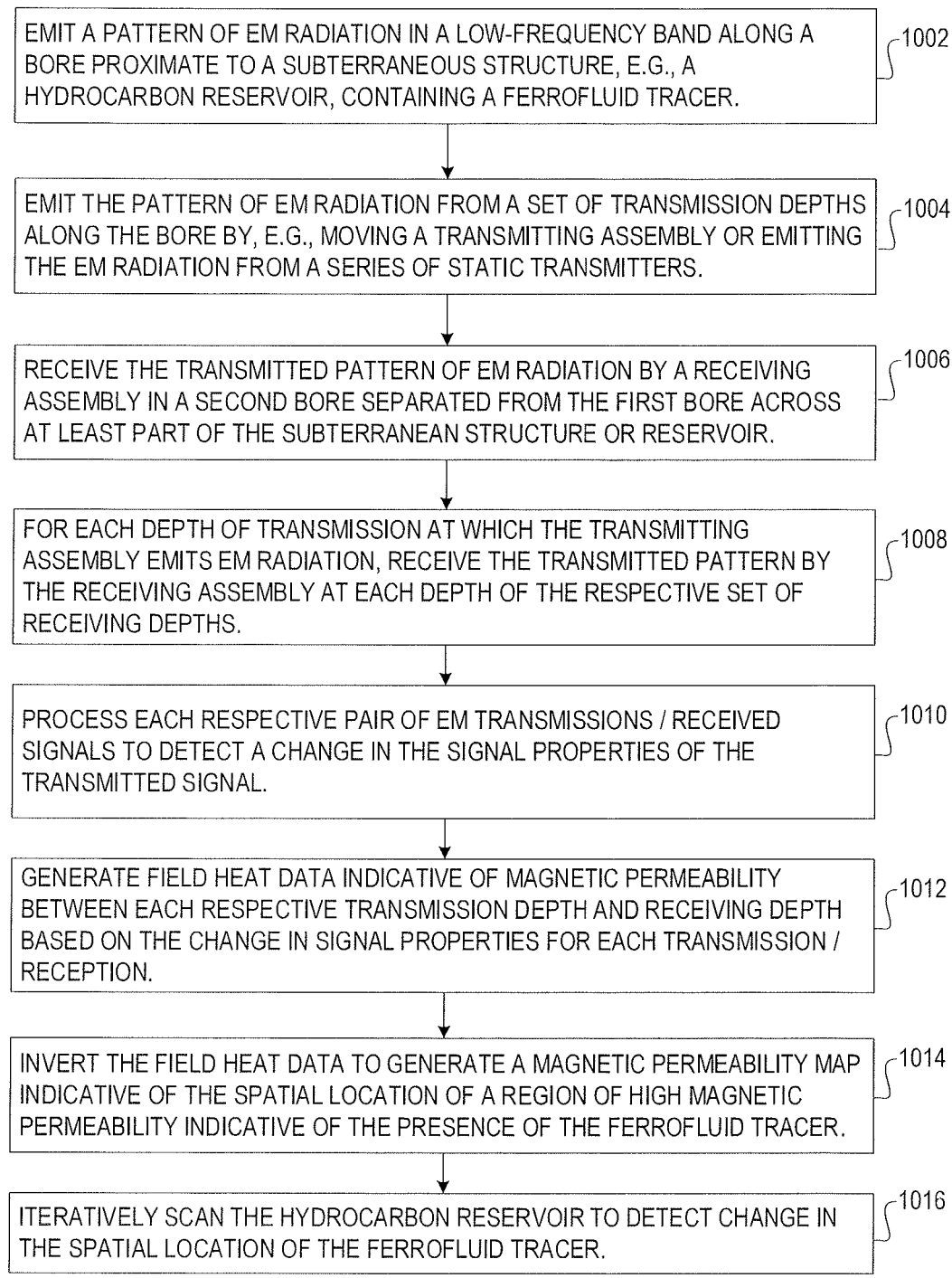
FIG. 10 is a process flow chart illustrating a method of conducting magnetic permeability-based EM mapping of a hydrocarbon reservoir using CA-MNPs.

FIG. 10 is a process flow chart 1000 illustrating a method of conducting magnetic permeability-based EM mapping of a hydrocarbon reservoir using CA-MNPs, in accordance with the methods described above as applied to the test case. In accordance with various embodiments, a ferrofluid containing ultradense, ultrastable MNPs can be injected into a hydrocarbon reservoir through a bore hole. This ferrofluid will tend to form a ferrofluid pocket that migrates through the hydrocarbon reservoir, or disperses, depending on the permeability of the rock formation in which it is injected, the hydrocarbon content, and the formation water content. The ferrofluid can be formed of any suitable mixture of available water and either a highly concentrated or dehydrated source of CA-MNPs, which may be mixed on-site just prior to injection in the bore hole.

According to some embodiments, a transmitting assembly can emit a pattern of EM radiation in a low-frequency band (e.g., 50-1000 Hz), or other suitable band that is sensitive to magnetic permeability (act 1002). This transmitting source can be moved along a bore hole adjacent or near the hydrocarbon reservoir, i.e. within 1 km, in order to project the EM radiation from multiple depths (act 1004). According to some embodiments, the transmission may be conducted at a plurality of discrete depths by one or more transmitters, may be conducted continuously while a singular transmitter (or multiple transmitter) moves, or may be conducted by separate transmitters positioned at multiple depths.

Concurrently with the EM transmission, a receiving assembly is positioned in a second borehole separated from the first borehole across at least a portion of the hydrocarbon reservoir, e.g. up to about 1 km away, or more, receiving the transmitted pattern of EM radiation (act 1006). The receiving assembly can also be moved along its respective bore hole to a plurality of depths, and for each depth of transmission at which the transmitting assembly emits EM radiation, the receiving assembly is moved throughout the range of its respective set of receiving depths (act 1008). As above, the receiving assembly can include a singular (or multiple) receivers that move up and down along the second bore, or can include an elongated receiver or a plurality of separate, static receivers that receive the EM transmissions at separate depths, either sequentially or at the same time. According to some embodiments, the transmitting assembly can emit the pattern of EM radiation sequentially from a plurality of depths, while the receiving assembly simultaneously receives the transmission at multiple individual receivers, or vice versa.

The EM transmissions received by the receiving assembly can be processed by a computing system to determine a change in the EM signal through the reservoir for each respective EM transmission as received at each receiving depth (act 1010). This processing stage can include, e.g., detecting change in phase or amplitude caused by the magnetic permeability of the intervening substrate and, if present, quantity of ferrofluid. A field heat chart can be generated from the processed data (act 1012), which can then be inverted according to the methods discussed above to reconstruct the spatial location of any ferrofluid pocket disposed within the hydrocarbon reservoir (act 1014). This process can be conducted iteratively in order to detect changes in the location of the ferrofluid pocket(s), indicative of formation water movement within the hydrocarbon reservoir (act 1016).

Synthesis of CA-MNPs

Following a combined effort of intensive research and numerous synthesis attempts, ultrastable hydrophilic citric acid-capped iron oxide $\gamma$-$Fe_2O_3$ nanoparticles (CA-MNPs) were successfully produced via a facile large-scale one-step synthesis. The proper size and the surface coating play a major role in achieving long-term dispersion stability of an aqueous dispersion alongside with a non-detachable coating that can endure harsh reservoir conditions. For oil-reservoir applications, the MNPs must be also able to stay dispersed individually in their fluid carrier when injected into the reservoir.

Figure 11:
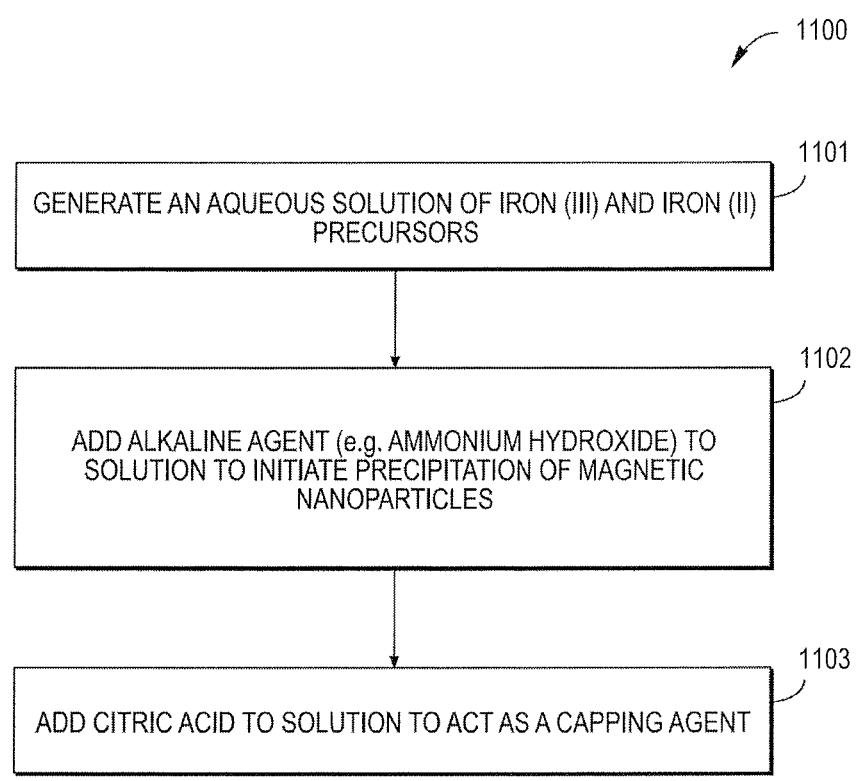
FIG. 11 is a process flow chart that summarizes the synthesis procedure for CA-MNPs.

FIG. 11 is a process flow chart summarizes the synthesis procedure 1100 of CA-MNPs. An aqueous solution of iron (III) and iron (II) precursors was formed (act 1101), following which co-precipitation of the iron (III) and iron (II) precursors was achieved under alkaline conditions using ammonium hydroxide (act 1102). This co-precipitation step was immediately followed by the addition of citric acid as a capping agent (act 1103) to control the growth of the iron oxide nanocrystals in the superparamagnetic domain as well as to aid the solubilization of the iron oxide nanoparticles in aqueous media.

In addition to the advantages noted above, the synthesis processes disclosed herein provide for additional benefits. For example, due to the facile one-step synthetic procedure, scaling up the synthetic method for acquiring large quantities of CA-MNPs is feasible. Furthermore, the high stability of the CA-MNPs into seawater facilitates the on-site production. Specifically, these improvements allow for fabricated CA-MNPs to be transported to the borehole site for mixing with seawater to produce the final magnetic fluid tracer. The ability to use concentrated CA-MNPs for on-site production greatly reduces the costs of deploying MNPs. The absence of chemical solvents ensures the eco-friendliness and low cost of utilizing this procedure.

The present disclosure describes, in particular, the first time synthesis of ultra-dense aqueous dispersions of hydrophilic MNPs (3 kg/L) via a facile one-step synthesis procedure. Based on this, nanoparticle-solutions at various concentrations were fabricated, which can be used as magnetic contrast agent in surveying movement of fluids in oil reservoirs. The disclosed synthesis provides for excellent stability of the produced hydrophilic MNPs solutions in seawater and formation water.

It is further noted that the produced CA-MNPs were characterized and tested with many different techniques which proved the adequacy for the proposed method. The reservoir rock pore size is significantly larger than the size of the CA-MNPs (approx. 10 nm). The core flooding results showed the durability of the ferrofluid in harsh environments combining high pressure and high temperature simulating the reservoir conditions during the oil production procedure.

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

In the following, further examples are described to facilitate the understanding of the invention:

Example A. A method of monitoring fluid flow in a rock formation, the method comprising:
  introducing a tracer fluid containing a homogeneous dispersion of ultrastable magnetic nanoparticles into the rock formation;
  introducing a fluid tracer containing a homogeneous dispersion of ultrastable magnetic nanoparticles into a hydrocarbon reservoir;
  emitting a first series of EM signals through the hydrocarbon reservoir by a transmitter from a first transmission depth located along a first bore;
  receiving the first series of EM signals by a receiver at a first plurality of receiving depths located along a second bore spatially separated from the first bore;
  emitting a second series of EM signals through the hydrocarbon reservoir by the transmitter from a second transmission depth along the first bore;
  receiving the second series of EM signals by the receiver at a second plurality of receiving depths located along the second bore;
  generating a first set of EM permeability data for a region between the first bore and the second bore, based on the received first series of EM signals and based on the received second series of received EM signals, indicative of variations in magnetic permeability between the first bore and the second bore; and
  generating, based on the first set of EM permeability data, a first magnetic permeability map of the region between the first bore and the second bore that is indicative of a location of the tracer fluid.

Example B. The method of example A, wherein the tracer fluid comprises a homogeneous dispersion of hydrophilic citric acid-capped iron oxide γ-$Fe_2O_3$ nanoparticles.

Example C. The method of example A or example B, wherein the ultrastable magnetic nanoparticles are stable at pressures and temperatures in excess of 32,000 kPa (320 bar) at 100° C.

Example D. The method of any one of the preceding examples, wherein the ultrastable magnetic nanoparticles are stable at ambient conditions for at least 6 months.

Example E. The method of any one of the preceding examples, wherein the ultrastable magnetic nanoparticles are approximately 10 nm in diameter.

Example F. The method of any one of the preceding examples, further comprising:
  forming the fluid tracer by mixing a concentrated quantity of prefabricated ultrastable magnetic nanoparticles with one of seawater or formation water or a combination of both seawater and formation water.

Example G. The method of any one of examples A-E, further comprising:
  forming the fluid tracer by dispersing a quantity of dry, prefabricated ultrastable magnetic nanoparticles in a high-salinity aqueous solution at a concentration of at least 500 g/L or to a density of at least 1.28 g/mL.

Example H. The method of any one of the preceding examples, wherein the ultrastable magnetic nanoparticles have a density of at least 3 kg/L.

Example I. The method of any one of the preceding examples, wherein the first series of EM signals are transmitted in a frequency range of 50-1000 Hz, preferably 100-500 Hz.

Example J. The method of any one of the preceding examples, wherein generating the first set of EM permeability data further comprises generating a two-dimensional grid of received EM signals corresponding to each respective combination of the first plurality of locations of the transmitter and the second plurality of locations of the receiver.

Example K. The method of any one of the preceding examples, wherein generating the magnetic permeability map comprises inverting the electric conductivity, magnetic permeability and acoustic tomography data.

Example L. The method of any one of the preceding examples, further comprising:
  subsequent to emitting the first series of EM signals, emitting a third series of EM signals through the hydrocarbon reservoir by the transmitter from the first transmission depth;
  receiving the third series of EM signals by the receiver at the first plurality of receiving depths;
  emitting a fourth series of EM signals through the hydrocarbon reservoir by the transmitter from the second transmission depth;
  receiving the fourth series of EM signals by the receiver at the second plurality of receiving depths;
  generating a second set of EM permeability data for the region at a time after the generation of the first set of EM permeability data; and
  detecting movement of the fluid tracer based on the second set of EM permeability data and the first set of EM permeability data.

Example M. The method of any one of the preceding examples, further comprising:
  emitting a plurality of EM signals by the transmitter from a plurality of transmission depths, including the first and second transmission depths;
  receiving each EM signal of the plurality of EM signals by the receiver from the first plurality of receiving depths or the second plurality of receiving depths, wherein the first and second pluralities of receiving depths can be identical or different.

Example N. The method of any one of the preceding examples wherein the second path is spatially separated from the first path by a distance of 500-1000 m.

Example O. A system for monitoring a tracer fluid containing a homogeneous dispersion of ultrastable magnetic nanoparticles injected in a hydrocarbon reservoir, the system comprising:
  a first transmitter configured for deployment along a first bore in or adjacent the hydrocarbon reservoir;
  a first receiver configured for deployment along a second bore spatially separated from the first bore; and a controller comprising at least one processor and memory device containing executable instructions that, when executed by the processor, cause the system to:
cause the first transmitter to emit a series of EM signals from a first plurality of positions at varying depth along the first bore;
cause the first receiver to record the series of EM signals from a second plurality of positions at varying depth along the second bore;
generate a first set of EM permeability data for a region between the first bore and the second bore, based on the series of received EM signals and the series of emitted EM signals, indicative of variations in magnetic permeability between the first bore and the second bore; and
generating, based on the first set of EM permeability data, a first magnetic permeability map of the region between the first bore and the second bore that is indicative of a location of the tracer fluid.

Example P. The system of example O, wherein the instructions are further configured to cause the first receiver to, for each transmitting location of the first transmitter, record the series of EM signals from the plurality of receiving locations.

Example Q. The system of example O, wherein the second bore is spatially separated from the first bore by a distance of 500-1000 m.

Example R. A method of forming an ultrastable magnetic tracer fluid comprising:
generating an aqueous solution of iron (III) and iron (II) precursors;
causing co-precipitation of the iron (III) and iron (II) precursors in the aqueous solution under alkaline conditions using ammonium hydroxide; and
introducing citric acid to the solution to cap growth of iron oxide nanocrystals from the co-precipitating precursors to form nanoparticles of hydrophilic citric acid-capped iron oxide $\gamma$-$Fe_2O_3$ having an average nanoparticle size of about 10 nm.

Example S. The method of example R, further comprising:
mixing the nanoparticles with one of seawater or formation water or a combination of both seawater and formation water.

Example T. The method of example R, further comprising:
separating the nanoparticles from the aqueous solution to form a quantity of dry, prefabricated ultrastable magnetic nanoparticles; and
dispersing the quantity of dry, prefabricated ultrastable magnetic nanoparticles in a saline aqueous solution.

What is claimed is:

1. A method of monitoring fluid flow in a hydrocarbon reservoir, the method comprising:
introducing a fluid tracer containing a homogeneous dispersion of ultrastable hydrophilic citric acid-capped iron oxide $\gamma$-$Fe_2O_3$ magnetic nanoparticles into a hydrocarbon reservoir, wherein the dispersion of the nanoparticles in the tracer fluid is stable at pressures in excess of 32,000 kPa (320 bar) at 100° C.;
emitting a first series of EM signals through the hydrocarbon reservoir by a transmitter from a first transmission depth located along a first bore;
receiving the first series of EM signals by a receiver at a first plurality of receiving depths located along a second bore spatially separated from the first bore;
emitting a second series of EM signals through the hydrocarbon reservoir by the transmitter from a second transmission depth along the first bore;
receiving the second series of EM signals by the receiver at a second plurality of receiving depths located along the second bore;
generating a first set of EM permeability data for a region between the first bore and the second bore, based on the received first series of EM signals and based on the received second series of EM signals, indicative of variations in magnetic permeability between the first bore and the second bore; and
generating, based on the first set of EM permeability data, a first magnetic permeability map of the region between the first bore and the second bore that is indicative of a location of the tracer fluid.

2. The method of claim 1, wherein the ultrastable magnetic nanoparticles are stable at ambient conditions for at least 6 months.

3. The method of claim 1, wherein the ultrastable magnetic nanoparticles have diameters in a range of 5-20 nm, preferably about 10 nm.

4. The method of claim 1, further comprising:
forming the fluid tracer by mixing a concentrated quantity of prefabricated ultrastable magnetic nanoparticles with one of seawater or formation water or a combination of both seawater and formation water.

5. The method of claim 1, further comprising:
forming the fluid tracer by dispersing a quantity of dry, prefabricated ultrastable magnetic nanoparticles in a high-salinity aqueous solution at a concentration of at least 500 g/L or to a density of at least 1.28 g/mL.

6. The method of claim 1, wherein the ultrastable magnetic nanoparticles have a density of at least 3 kg/L.

7. The method of claim 1, wherein the first series of EM signals and the second series of EM signals are transmitted in a frequency range of 50-1000 Hz, preferably 200-400 Hz.

8. The method of claim 1, wherein generating the first set of EM permeability data further comprises generating a two-dimensional grid of received EM signals corresponding to each respective combination of the first plurality of locations of the transmitter and the second plurality of locations of the receiver.

9. The method of claim 1, wherein generating the magnetic permeability map comprises inverting electric conductivity, magnetic permeability and acoustic tomography data.

10. The method of claim 1, further comprising:
subsequent to emitting the first series of EM signals, emitting a third series of EM signals through the hydrocarbon reservoir by the transmitter from the first transmission depth;
receiving the third series of EM signals by the receiver at the first plurality of receiving depths;
emitting a fourth series of EM signals through the hydrocarbon reservoir by the transmitter from the second transmission depth;
receiving the fourth series of EM signals by the receiver at the second plurality of receiving depths;
generating a second set of EM permeability data for the region at a time after the generation of the first set of EM permeability data; and
detecting movement of the fluid tracer based on the second set of EM permeability data and the first set of EM permeability data.

11. The method of claim 1, further comprising:
emitting a plurality of EM signals by the transmitter from a plurality of transmission depths, including the first and second transmission depths;
receiving each EM signal of the plurality of EM signals by the receiver from the first plurality of receiving depths or the second plurality of receiving depths, wherein the first and second pluralities of receiving depths can be identical or different.

12. The method of claim 1, wherein the second bore is spatially separated from the first bore by a distance of 500-1000 m.

13. A system for monitoring a tracer fluid containing a homogeneous dispersion of ultrastable hydrophilic citric acid-capped iron oxide $\gamma$-$Fe_2O_3$ magnetic nanoparticles injected in a hydrocarbon reservoir, wherein the dispersion of the nanoparticles in the tracer fluid is stable at pressures in excess of 32,000 kPa (320 bar) at 100° C., the system comprising:
a first transmitter configured for deployment along a first bore in or adjacent the hydrocarbon reservoir;
a first receiver configured for deployment along a second bore spatially separated from the first bore; and
a controller comprising at least one processor and memory device containing executable instructions that, when executed by the processor, cause the system to:
cause the first transmitter to emit a series of EM signals from a first plurality of transmitting locations at varying depth along the first bore;
cause the first receiver to receive the series of EM signals from a second plurality of receiving locations at varying depth along the second bore;
generate a first set of EM permeability data for a region between the first bore and the second bore, based on the series of received EM signals and the series of emitted EM signals, indicative of variations in magnetic permeability between the first bore and the second bore; and
generate, based on the first set of EM permeability data, a first magnetic permeability map of the region between the first bore and the second bore that is indicative of a location of the tracer fluid.

14. The system of claim 13, wherein the instructions are further configured to cause the first receiver to, for each transmitting location of the first transmitter, receive the series of EM signals from the plurality of receiving locations.

15. The system of claim 13, wherein the second bore is spatially separated from the first bore by a distance of 500-1000 m.

* * * * *